United States Patent
Umada et al.

(10) Patent No.: US 12,145,879 B2
(45) Date of Patent: Nov. 19, 2024

(54) CHEMICALLY STRENGTHENED GLASS PLATE, AND COVER GLASS AND ELECTRONIC DEVICE COMPRISING CHEMICALLY STRENGTHENED GLASS

(71) Applicant: AGC Inc., Tokyo (JP)

(72) Inventors: Takumi Umada, Tokyo (JP); Kenji Imakita, Tokyo (JP); Yusuke Arai, Tokyo (JP); Qing Li, Tokyo (JP)

(73) Assignee: AGC Inc., Tokyo (JP)

( * ) Notice: Subject to any disclaimer, the term of this patent is extended or adjusted under 35 U.S.C. 154(b) by 662 days.

(21) Appl. No.: 17/339,088

(22) Filed: Jun. 4, 2021

(65) Prior Publication Data

US 2021/0292225 A1    Sep. 23, 2021

Related U.S. Application Data

(63) Continuation of application No. PCT/JP2019/047189, filed on Dec. 3, 2019.

(30) Foreign Application Priority Data

Dec. 11, 2018 (JP) ................. 2018-231776

(51) Int. Cl.
| | |
|---|---|
| B32B 15/04 | (2006.01) |
| B32B 17/06 | (2006.01) |
| C03C 3/083 | (2006.01) |
| C03C 10/00 | (2006.01) |

(52) U.S. Cl.
CPC .......... *C03C 3/083* (2013.01); *C03C 10/0027* (2013.01)

(58) Field of Classification Search
CPC .................................................. C03C 21/002
USPC ................................................... 428/426, 410
See application file for complete search history.

(56) References Cited

U.S. PATENT DOCUMENTS

| | | | | |
|---|---|---|---|---|
| 11,731,901 | B2* | 8/2023 | Li | ........................ C03C 10/0054 |
| | | | | 428/332 |
| 11,767,252 | B2* | 9/2023 | Murayama | ............ C03C 21/002 |
| | | | | 501/63 |
| 2012/0052271 | A1 | 3/2012 | Gomez et al. | |
| 2012/0135848 | A1* | 5/2012 | Beall | ................... C03C 10/0054 |
| | | | | 65/30.14 |

(Continued)

FOREIGN PATENT DOCUMENTS

| | | |
|---|---|---|
| JP | 2013-536155 | 9/2013 |
| JP | 2017-537862 A | 12/2017 |

(Continued)

OTHER PUBLICATIONS

International Search Report issued Feb. 25, 2020 in PCT/JP2019/047189, filed on Dec. 3, 2019, 2 pages.

*Primary Examiner* — Lauren R Colgan
(74) *Attorney, Agent, or Firm* — Oblon, McClelland, Maier & Neustadt, L.L.P.

(57) ABSTRACT

The present invention relates to a chemically strengthened glass sheet in which a value of SB/(SA×t) is 5.0 mm$^{-1}$ or more, where SA (MPa·μm) is an integrated value of a compressive stress from a surface of the glass sheet to a depth of 10 μm, SB (MPa·μm) is an integrated value of a compressive stress from the depth of 10 μm to DOL which is a depth at which the compressive stress is zero, and t (mm) is a thickness of the glass sheet.

20 Claims, 4 Drawing Sheets

(56) References Cited

U.S. PATENT DOCUMENTS

| | | | |
|---|---|---|---|
| 2013/0045375 A1* | 2/2013 | Gross | C03C 10/0018 |
| | | | 428/220 |
| 2014/0134397 A1* | 5/2014 | Amin | C03C 10/0045 |
| | | | 428/141 |
| 2015/0030840 A1 | 1/2015 | Gomez et al. | |
| 2015/0099124 A1* | 4/2015 | Beunet | C03C 21/002 |
| | | | 65/30.14 |
| 2015/0274581 A1* | 10/2015 | Beall | C03C 10/0054 |
| | | | 501/4 |
| 2016/0102011 A1* | 4/2016 | Hu | C03C 23/007 |
| | | | 428/155 |
| 2016/0102014 A1* | 4/2016 | Hu | C03C 3/091 |
| | | | 501/67 |
| 2016/0280589 A1* | 9/2016 | Beall | C03C 4/0092 |
| 2017/0295657 A1* | 10/2017 | Gross | C03C 21/002 |
| 2017/0305786 A1* | 10/2017 | Roussev | C03C 3/097 |
| 2018/0002223 A1 | 1/2018 | Hu et al. | |
| 2018/0029932 A1 | 2/2018 | Hu et al. | |
| 2018/0057401 A1 | 3/2018 | Hu et al. | |
| 2018/0105461 A1* | 4/2018 | Schneider | C03C 17/30 |
| 2019/0016632 A1 | 1/2019 | Hu et al. | |
| 2019/0202730 A1 | 7/2019 | Gomez et al. | |
| 2019/0210916 A1 | 7/2019 | Hu et al. | |
| 2020/0039876 A1* | 2/2020 | Imakita | C03C 3/091 |
| 2020/0207660 A1* | 7/2020 | Li | C03B 32/02 |
| 2020/0325066 A1 | 10/2020 | Murayama et al. | |
| 2020/0385305 A1 | 12/2020 | Hu et al. | |
| 2021/0002167 A1 | 1/2021 | Hu et al. | |

FOREIGN PATENT DOCUMENTS

| | | |
|---|---|---|
| WO | WO 2018/186402 A1 | 10/2018 |
| WO | WO 2019/022035 A1 | 1/2019 |

\* cited by examiner

CHEMICALLY STRENGTHENED GLASS PLATE, AND COVER GLASS AND ELECTRONIC DEVICE COMPRISING CHEMICALLY STRENGTHENED GLASS

TECHNICAL FIELD

The present invention relates to a chemically strengthened glass.

BACKGROUND ART

A glass sheet made of chemically strengthened glass is used as, for example, cover glasses of portable terminals.

Chemically strengthened glass is glass in which a compressive stress layer is formed in a surface layer portion by causing ion exchange between alkali ions contained in the glass and alkali ions having a larger ion radius that are contained in molten salt by, for example, a method of immersing the glass in the molten salt such as sodium nitrate. The strength of chemically strengthened glass strongly depends on a stress profile that is represented by values of compressive stress with the depth from the glass surface as a variable.

The cover glass of a portable terminal or the like may be broken when it bends due to external force. To prevent such breaking (flexural fracture), it is effective to form a large compressive stress at the glass sheet surface. A glass sheet that has been bent by external force breaks if minute cracks in the glass sheet surface are expanded by the bending of the glass sheet. However, the expansion of minute cracks is suppressed if a large compressive stress is formed in the vicinity of the glass surface.

The cover glass of a portable terminal or the like may be broken by collision with a projection when the terminal drops onto asphalt or sand. In this case, the origin of breaking is located at a deep position from the glass surface. Thus, to prevent breaking by collision, it is considered effective to form compressive stress to a deeper portion in the glass sheet thickness direction and thereby prevent the expansion of cracks inside the glass.

On the other hand, when a compressive stress layer is formed in a glass surface layer portion, tensile stress occurs inside the glass according to the total amount (integrated value) of the formed compressive stress. If the tensile stress value is large, the glass causes violent fragmentation when it breaks. In view of the above, a chemically strengthened glass is designed so as to make a compressive stress value at the glass surface large and form compressive stress to a deeper portion and, on the other hand, to prevent the total amount of compressive stress from becoming too large.

Disclosed in Patent document 1 is a method of performing two-step chemical strengthening using glass containing lithium ions. This method can produce a large compressive stress in a surface portion of the glass by sodium-potassium exchange and produce a little small compressive stress in a deeper portion by lithium-sodium exchange.

This method was thought to suppress the fragmentation at the time of breaking while effectively suppressing both of flexural fracture and fracture due to collision with a projection.

CITATION LIST

Patent Literature

Patent document 1: JP-T-2013-536155 (the symbol "JP-T" as used herein means a published Japanese translation of a PCT patent application)

SUMMARY OF INVENTION

Technical Problem

However, in actuality, there may occur a case that sufficient strength is not obtained even using a stress profile as described in Patent document 1. An object of the present invention is to provide a chemically strengthened glass sheet in which the fragmentation at the time of breaking is suppressed while effectively suppressing both of flexural fracture and fracture due to collision with a projection.

Solution to Problem

The present inventors have completed the present invention by finding that a compressive stress can be formed to a deep portion of a glass in its sheet thickness direction while suppressing the total amount of compressive stress by adjusting the relationship between compressive stress values from the glass surface to 10 μm and compressive stress values in a portion deeper than 10 μm.

The present invention provides a chemically strengthened glass sheet in which a value of SB/(SA×t) is 5.0 mm$^{-1}$ or more, where SA (MPa·μm) is an integrated value of a compressive stress from a surface of the glass sheet to a depth of 10 μm, SB (MPa·μm) is an integrated value of a compressive stress from the depth of 10 μm to DOL which is a depth at which the compressive stress is zero, and t (mm) is a thickness of the glass sheet.

Furthermore, the present invention provides a cover glass including the above-mentioned chemically strengthened glass sheet.

Furthermore, the present invention provides an electronic device including the above-mentioned chemically strengthened glass sheet.

Advantageous Effects of Invention

The present invention can provide a chemically strengthened glass in which both of flexural fracture and fracture due to collision with a projection are less apt to occur and the fragmentation at the time of breaking is suppressed.

DESCRIPTION OF EMBODIMENT

Figure 1:
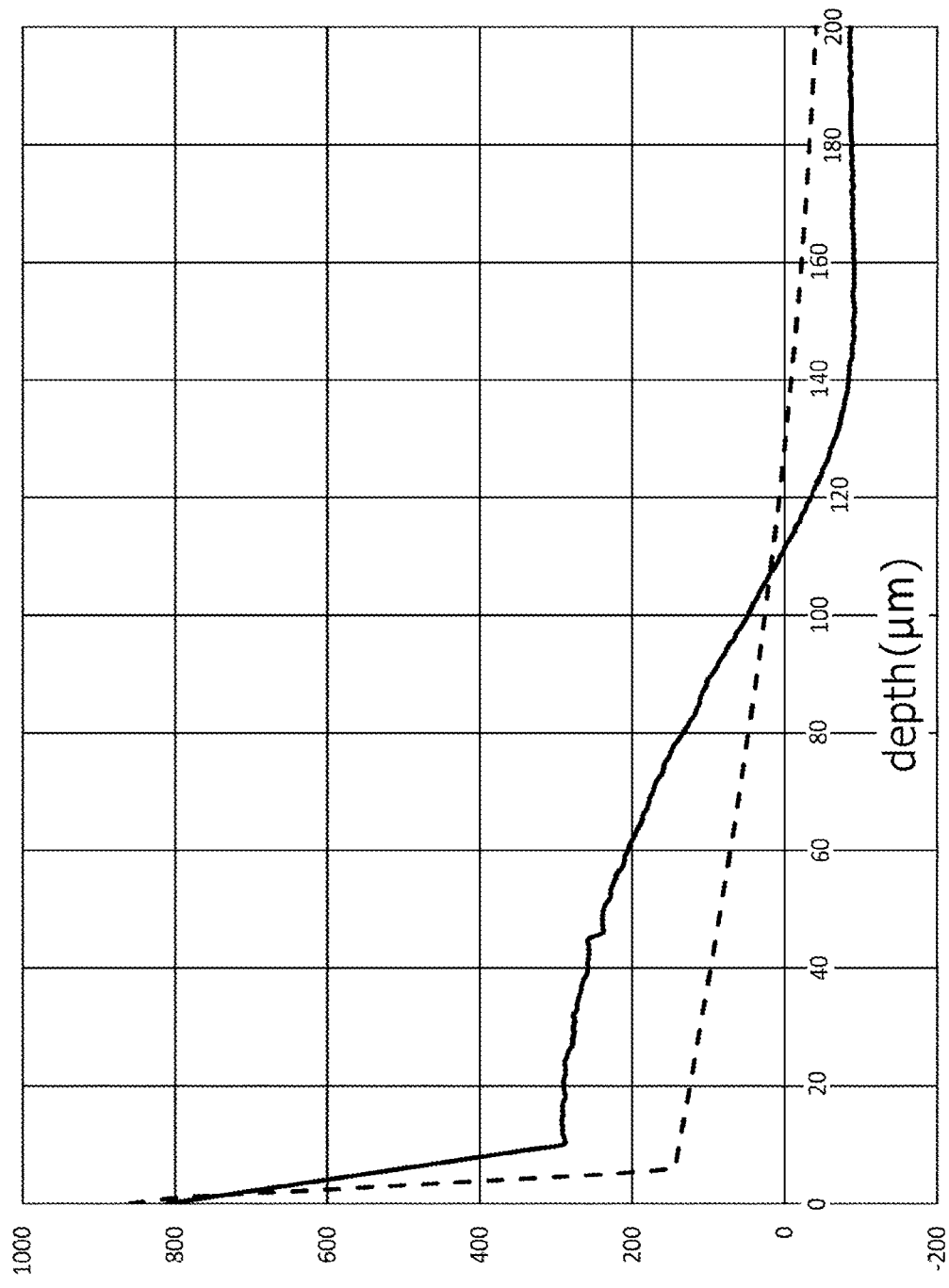
FIG. 1 is a graph showing example stress profiles of chemically strengthened glass sheets.

In this specification, a symbol "-" indicating a numerical range is used in such a sense as to include numerical values written before and after it as lower limit and upper limit and will be used in the same sense in the following unless otherwise specified.

In this specification, the term "stress profile" means compressive stress values having a depth from a surface of a glass sheet as a variable. The term "depth of compressive stress layer (DOL)" means a depth at which the compressive stress value CS is zero.

In the present invention, a stress profile is measured by a birefringence stress meter using a thin sample taken from a cross section of a glass sheet. Birefringence stress meters are instruments that measure a magnitude of retardation caused by stress using a polarizing microscope, a liquid crystal compensator, etc., and one example thereof is a birefringence imaging system Abrio-IM produced by CRi, Inc.

Compressive stress values near the surface of a glass sheet may be measured using an optical waveguide surface stress meter (e.g., FSM-6000 produced by Orihara Manufacturing Co., Ltd.). Optical waveguide surface stress meters can measure stress values without performing work of, for example, forming a thin piece of a glass sample. However, from the principle of measurement, optical waveguide surface stress meters can measure stress only in a case that the refractive index decreases from the surface inward. As a result, in the case where aluminosilicate glass containing lithium is chemically strengthened, there may occur a case that compressive stress inside a glass sheet cannot be measured.

Stress values inside a glass sheet may be measured using a scattered light photoelasticity stress meter (e.g., SLP-1000 produced by Orihara Manufacturing Co., Ltd.). Scattered light photoelasticity stress meters can measure stress values without performing work of, for example, forming a thin piece of a glass sample regardless of a refractive index distribution inside the glass. However, it is difficult for scattered light photoelasticity stress meters to measure stress values near the surface of glass accurately because they are prone to be influenced by surface-scattered light.

In this specification, the term "chemically strengthened glass" means glass that has been subjected to chemical strengthening treatment and the term "glass for chemical strengthening" means glass before being subjected to chemical strengthening treatment.

In this specification, the term "base composition of chemically strengthened glass" means a glass composition of glass for chemical strengthening. A glass composition of a portion at a depth of ½ of the sheet thickness t of chemically strengthened glass is a base composition of the chemically strengthened glass, except for a case where immoderate ion exchange treatment is performed.

In this specification, a glass composition of first glass is expressed in terms of mol % on an oxide basis unless otherwise specified and mol % is simply written as "%." A glass composition of second glass is expressed in terms of mass % on an oxide basis unless otherwise specified and mass % is simply written as "%."

In this specification, the expression "containing substantially no" means that a concentration of a substance is lower than or equal to levels of impurities contained in raw materials etc., that is, the substance is not contained intentionally. More specifically, a concentration thereof is less than 0.1%, for example.

<Chemically Strengthened Glass Sheet>

Although the present chemically strengthened glass sheet ordinarily has a shape of a flat sheet, it may be a glass sheet having flat-sheet-shape with no warp or a curved glass sheet having a curved surface. It may have, for example, a chamfered shape whose outer circumferential portion varies in thickness. Furthermore, it may be a sheet whose two major surfaces are not parallel with each other, or may be a sheet in which all or a part of one or both of its two major surfaces is curved surface.

The sheet thickness (t) of the present chemically strengthened glass sheet is preferably 0.2 mm or more, even preferably 0.4 mm or more and further preferably 0.5 mm or more.

The sheet thickness (t) is preferably 2 mm or less, even preferably 1.5 mm or less, 1 mm or less, 0.9 mm or less, 0.8 mm or less, and 0.7 mm or less.

Having an improved stress profile, the present chemically strengthened glass sheet is less apt to break and less apt to fracture violently when it breaks.

It is considered that in general chemically strengthened glass can be made less apt to break by suppressing expansion of minute cracks in a glass surface by increasing the compressive stress value at the glass surface. It is also considered that chemically strengthened glass can be made less apt to break even when receiving strong impact by forming a compressive stress layer to a deeper portion of the glass by increasing the depth of the compressive stress layer.

However, a tensile stress layer is necessarily formed inside the glass when a compressive stress layer is formed in the surface of the glass. If internal tensile stress values are large, the chemically strengthened glass is prone to cause violent fragmentation and scatter fragments when it breaks. Since an integrated value of internal tensile stress is balanced with an integrated value of compressive stress, it is necessary to reduce the integrated value of compressive stress to make internal tensile stress values smaller.

When the integrated value of compressive stress from the surface of a glass sheet to a depth of 10 µm is represented by SA (unit: MPa·µm) and the integrated value of compressive stress from the depth of 10 µm to a depth (DOL) at which the compressive stress is zero is represented by SB (unit: MPa·µm), a large SB/SA value means that large compressive stress exists in a relatively deep portion of the glass in the sheet thickness direction, which is advantageous in preventing breaking due to collision. On the other hand, the compressive stress SA in the vicinity of the glass surface is required to be introduced at a certain level to prevent breaking due to flexural deformation in a drop test.

The present inventors thought that to design a stress profile such that explosive fragmentation does not occur at the time of receiving damage, a proper SB/SA ratio would become smaller as the sheet thickness decreases, and employed SB/(SA×t) as an evaluation index of a stress profile.

In the present chemically strengthened glass sheet, it is preferable that SB/(SA×t) is 5.0 mm$^{-1}$ or more. When SB/(SA×t) is large, compressive stress in a portion that is relatively deep from the surface of a glass sheet is large, thereby making it possible to prevent fracture due to collision effectively. It is even preferable that SB/(SA×t) is 6.0 mm$^{-1}$ or more.

Whereas too large a total amount of compressive stress causes violent fragmentation at the time of receiving damage, SA needs to be large for the purpose of preventing flexural fracture. Thus, SB/(SA×t) is preferably 25.0 mm$^{-1}$ or less, even preferably 20.0 mm$^{-1}$ or less.

In the present chemically strengthened glass sheet, to obtain high strength, SA+SB is preferably 15,000 MPa·µm or more, even preferably 17,000 MPa·µm or more. To prevent the internal tensile stress from becoming too large, SA+SB is preferably 26,000 MPa·μm or less, even preferably 22,000 MPa·μm or less.

In the present chemically strengthened glass sheet, SA is preferably 4,000 MPa·μm or less, even preferably 3,500 MPa·μm or less and further preferably 3,000 MPa·μm or less. To prevent flexural fracture, SA is preferably 1,000 MPa·μm or more, even preferably 1,500 MPa·μm or more and further preferably 2,000 MPa·μm or more.

SB is preferably 12,000 MPa·μm or more, even preferably 14,000 MPa·μm or more and further preferably 16,000 MPa·μm or more. Since too large SB causes violent fragmentation at the time of receiving damage, it is preferable that SB is preferably 22,000 MPa·μm or less. It is even preferable that SB is 20,000 MPa·μm or less.

The surface compressive stress value ($CS_0$) is preferably 500 MPa or more, even preferably 600 MPa or more and further preferably 700 MPa or more. Since too large $CS_0$ makes it difficult to keep a balance between internal tensile stress and compressive stress in a deeper portion while keeping the internal tensile stress small, $CS_0$ is preferably 1,400 MPa or less, even preferably 1,300 MPa or less.

In the present chemically strengthened glass sheet, the compressive stress value ($CS_{10}$) at a position having a depth of 10 μm from the surface is preferably 180 MPa or more, even preferably 200 MPa or more. However, since too large $CS_{10}$ makes it difficult to keep a stress profile balance, it is preferable that $CS_{10}$ is 300 MPa or less to prevent violent fracture while increasing the strength.

In the present chemically strengthened glass sheet, the compressive stress value ($CS_{50}$) at a position having a depth of 50 μm from the surface is preferably 150 MPa or more, even preferably 170 MPa or more. The lowest height at which glass fractures when dropped increases as $CS_{50}$ is larger. However, since too large $CS_{50}$ tends to make the internal tensile stress large, $CS_{50}$ is preferably 350 MPa or less, even preferably 300 MPa or less to prevent violent fracture.

The depth of the compressive stress layer (DOL) of the present chemically strengthened glass sheet is 50 μm or more, preferably 80 μm or more and even preferably 100 μm or more. The DOL is even preferably 110 μm or more and further preferably 120 μm or more. It is preferable that DOL is, for example, 150 μm or less. Since too large DOL with respect to the sheet thickness t makes the internal tensile stress too large, DOL is preferably t/4 or less, even preferably t/5 or less. More specifically, DOL is 160 μm or less in the case where the sheet thickness t is 0.8 mm, for example.

To prevent explosive fragmentation at the time of receiving damage, it is preferable that the internal tensile stress CT of the present chemically strengthened glass sheet is 110 MPa or less. It is even preferable that CT is 105 MPa or less. To obtain high strength by increasing compressive stress values in the vicinity of the surface, the internal tensile stress is preferably 60 MPa or more, even preferably 70 MPa or more.

Four-point bending strength of the present chemically strengthened glass sheet is preferably 500 MPa or more, even preferably 600 MPa or more and further preferably 700 MPa or more. The four-point bending strength of the present chemically strengthened glass sheet is typically 900 MPa or less.

The four-point bending strength can be evaluated by performing a four-point bending test under conditions that the distance between outside support points and the distance between inside support points of a support are 30 mm and 10 mm, respectively, and the crosshead speed is 0.5 mm/min using a strip-shaped test piece measuring 10 mm×50 mm. The number of test pieces are 10, for example.

The present chemically strengthened glass sheet may be crystallized glass. It may also be colored glass. In those cases, it is preferable that the average transmittance in a wavelength range of 380 nm-780 nm (may be referred to as "visible light transmittance" in the following) is 85% or more because if this condition is satisfied a picture on the display is easy to view when the glass sheet is used as a cover glass of a portable display. The visible light transmittance is even preferably 88% or more, further preferably 90% or more.

The haze value is preferably 0.5% or less, even preferably 0.4% or less and further preferably 0.3% or less.

<Manufacturing Method of Chemically Strengthened Glass Sheet>

A chemically strengthened glass sheet of the present invention is obtained by subjecting a glass sheet for chemical strengthening to chemical strengthening treatment.

In the present invention, chemical strengthening treatment (ion exchange treatment) can be performed by, for example, immersing a glass sheet for 0.1-500 hours in molten salt such as potassium nitrate that has been heated to 360-600° C. It is preferable that heating temperature of the molten salt is 375-500° C., and it is preferable that the time of immersion of the glass sheet in the molten salt is 0.3-200 hours.

Examples of molten salt to be used for chemical strengthening treatment include nitrates, sulfates, carbonates, and chlorides. Among them, example nitrates include lithium nitrate, sodium nitrate, potassium nitrate, cesium nitrate, and silver nitrate. Example sulfates include lithium sulfate, sodium sulfate, potassium sulfate, cesium sulfate, and silver sulfate. Example carbonates include lithium carbonate, sodium carbonate, and potassium carbonate. Example chlorides include lithium chloride, sodium chloride, potassium chloride, cesium chloride, and silver chloride. These kinds of molten salt may be used alone or in combination of plural kinds thereof.

In the present invention, a proper set of treatment conditions for chemical strengthening treatment may be selected taking into consideration characteristics and a composition of glass for chemical strengthening, a kind of molten salt, and chemical strengthening properties such as surface compressive stress and a depth of a compressive stress layer that is required for chemically strengthened glass finally obtained, and other factors.

In particular, it is preferable to subject amorphous glass or crystallized glass having a large fracture toughness value to long-term chemical strengthening treatment. When ion exchange reaction has proceeded as a result of long-term chemical strengthening treatment, large compressive stress occurs in a surface layer portion and, at the same time, the compressive stress decreases mainly in the vicinity of the surface by structural relaxation, making it easier to obtain a compressive stress balance of the present invention.

In the present invention, chemical strengthening treatment may be performed either only once or plural times under two or more different sets of conditions (multi-step strengthening). For example, first-stage chemical strengthening treatment is performed under such conditions as to make a DOL value large and make a CS value relatively small. Then second-stage chemical strengthening treatment is performed under such conditions as to make the DOL value small and make the CS value relatively large. As a result, the internal tensile stress (CT) of the chemically strengthened glass can be made small while its CS at the outermost surface is made large.

<Glass for Chemical Strengthening>

In the present invention, the glass for chemical strengthening may be any of colorless amorphous glass, colored amorphous glass, and crystallized glass. In those cases, it is preferable that the visible light transmittance is 85% or more because if this condition is satisfied a picture on the display is easy to view when the glass is used as a cover glass of a portable display. The visible light transmittance is even preferably 88% or more, further preferably 90% or more.

The haze value is preferably 0.5% or less, even preferably 0.4% or less and further preferably 0.3% or less.

Lithium aluminosilicate glass is preferable as a glass for chemical strengthening of the present invention.

The fracture toughness value of the glass for chemical strengthening is preferably 0.8 MPa·m$^{1/2}$ or more, even preferably 0.9 MPa·m$^{1/2}$ or more and further preferably 1.0 MPa·m$^{1/2}$ or more. This is because violent fracture is less apt to occur for a glass having a large fracture toughness value even if CT becomes large when it is chemically strengthened.

As the chemically strengthened glass of the present invention, first glass that includes, for example, in terms of mol % on an oxide basis, 40% or more of $SiO_2$, 20% or more of $Al_2O_3$, and 5% or more of $Li_2O$ is preferable. The first glass is amorphous glass and, more specifically, has the following composition. That is, in terms of mol % on an oxide basis:

40-60% of $SiO_2$;
20-45% of $Al_2O_3$; and
5-15% of $Li_2O$.

The composition of the first glass will be described below.

In the first glass, $SiO_2$ is a component that constitutes a frame work of a glass network structure. $SiO_2$ is also a component increasing chemical durability. To attain sufficient chemical durability, the $SiO_2$ content is preferably 40% or more, even preferably 44% or more and further preferably 48% or more.

To obtain high strength of the glass, the $SiO_2$ content is preferably 60% or less, even preferably 58% or less and further preferably 55% or less.

$Al_2O_3$ is an essential component of the first glass and is a component that contributes to increasing the strength of the glass. To attain sufficient strength, the $Al_2O_3$ content is preferably 20% or more, even preferably 24% or more and further preferably 28% or more. To obtain high meltability, the $Al_2O_3$ content is preferably 45% or less, even preferably 40% or less and further preferably 35% or less.

$Li_2O$ is a component for forming surface compressive stress by ion exchange and is an essential component of lithium aluminosilicate glass. A chemically strengthened glass having a preferable stress profile is obtained by subjecting a lithium aluminosilicate glass to chemical strengthening. To obtain a large depth of the compressive stress layer (DOL), the $Li_2O$ content is preferably 5% or more, even preferably 7% or more and further preferably 8% or more.

To prevent occurrence of devitrification during glass manufacture or at the time of bending, the $Li_2O$ content is preferably 15% or less, even preferably 13% or less and further preferably 12% or less.

$Na_2O$ is a component for forming a surface compressive stress layer by ion exchange that utilizes molten salt containing potassium. $Na_2O$ is also a component for improving the glass meltability. The $Na_2O$ content is preferably 0.5% or more, even preferably 1% or more and further preferably 1.5% or more. The $Na_2O$ content is preferably 10% or less, even preferably 8% or less and further preferably 6% or less.

$K_2O$ may be contained to improve glass meltability and prevent devitrification. The $K_2O$ content is preferably 0.5% or more, even preferably 1% or more.

To obtain a large compressive stress value by ion exchange, the $K_2O$ content is preferably 5% or less, even preferably 3% or less and further preferably 1% or less.

Each of alkali metal oxides (may be written together as "$R_2O$") such as $Li_2O$, $Na_2O$, and $K_2O$ is a component for lowering the glass melting temperature, and it is preferable that they are contained at 5% or more in total. The total content $R_2O$ of alkali metal oxides is preferably 5% or more, even preferably 7% or more and further preferably 8% or more. To maintain the glass strength, $R_2O$ is preferably 20% or less and even preferably 18% or less.

To increase the meltability, it is preferable that the first glass includes $Y_2O_3$. The $Y_2O_3$ content is preferably 1% or more, even preferably 2% or more and further preferably 3% or more.

To maintain its high strength, the $Y_2O_3$ content is preferably 6% or less, even preferably 5.5% or less and further preferably 5% or less.

Although each of alkali earth metal oxides such as MgO, CaO, SrO, BaO, and ZnO is a component for enhancing the glass meltability, they tend to lower the ion exchange performance. The total content (MgO+CaO+SrO+BaO+ZnO) of MgO, CaO, SrO, BaO, and ZnO is preferably 15% or less, even preferably 10% or less and further preferably 5% or less.

In the case of containing any of MgO, CaO, SrO, BaO, and ZnO, it is preferable that MgO is contained to increase the strength of the chemically strengthened glass. In the case of containing MgO, the content thereof is preferably 0.1% or more, even preferably 0.5% or more. To obtain high ion exchange performance, the MgO content is preferably 10% or less, even preferably 8% or less.

In the case of containing CaO, the content thereof is preferably 0.5% or more, even preferably 1% or more. To attain high ion exchange performance, the CaO content is preferably 5% or less, even preferably 3% or less.

In the case of containing SrO, the content thereof is preferably 0.5% or more, even preferably 1% or more. To attain high ion exchange performance, the SrO content is preferably 5% or less, even preferably 3% or less.

In the case of containing BaO, the content thereof is preferably 0.5% or more, even preferably 1% or more. To attain high ion exchange performance, the BaO content is preferably 5% or less, even preferably 1% or less. It is further preferable that substantially no BaO is contained.

ZnO is a component for improving the glass meltability and may be contained. In the case of containing ZnO, the content thereof is preferably 0.2% or more, even preferably 0.5% or more. To obtain high glass weatherability, the ZnO content is preferably 5% or less, even preferably 3% or less.

Although $B_2O_3$ is not essential, it may be added to, for example, improve the meltability in glass manufacture. To decrease the inclination of a stress profile in the vicinity of the surface of the chemically strengthened glass, the $B_2O_3$ content is preferably 0.5% or more, even preferably 1% or more and further preferably 2% or more.

Since $B_2O_3$ is a component for facilitating stress relaxation after chemical strengthening, to prevent reduction of surface compressive stress by stress relaxation, the $B_2O_3$ content is preferably 10% or less, even preferably 8% or less, further preferably 5% or less, and most preferably 3% or less.

$P_2O_5$ may be contained to enhance the ion exchange performance. In the case of containing $P_2O_5$, the content thereof is preferably 0.5% or more, even preferably 1% or more. To obtain high chemical durability, the $P_2O_5$ content is preferably 10% or less, even preferably 5% or less and further preferably 3% or less.

$TiO_2$ is a component for suppressing the scattering of fragments when a chemically strengthened glass fractures, and may be contained. In the case of containing $TiO_2$, the content thereof is preferably 0.1% or more. To prevent devitrification at the time of melting, the $TiO_2$ content is preferably 5% or less, even preferably 1% or less. It is further preferable that substantially no $TiO_2$ is contained.

$ZrO_2$ is a component for increasing the surface compressive stress produced by ion exchange, and may be contained. In the case of containing $ZrO_2$, the content thereof is preferably 0.5% or more, even preferably 1% or more. To prevent devitrification at the time of melting, the $ZrO_2$ content is preferably 5% or less, even preferably 3% or less.

The total content ($TiO_2+ZrO_2$) of $TiO_2$ and $ZrO_2$ is preferably 5% or less, even preferably 3% or less.

$Nb_2O_5$, $Ta_2O_5$, and $Gd_2O_3$ are components for suppressing fragmentation of a chemically strengthened glass, and may be contained. In the case of containing these components, the total content thereof is preferably 0.5% or more, even preferably 1% or more, further preferably 1.5% or more, and particularly preferably 2% or more.

The first glass may contain, for example, $SO_3$, a chloride, or a fluoride as a refining agent to be used during manufacture. It is preferable that substantially no $As_2O_3$ is contained. In the case of containing $Sb_2O_3$, its content is preferably 0.3% or less, even preferably 0.1% or less. It is most preferable that substantially no $Sb_2O_3$ is contained.

In the case where the chemically strengthened glass is a colored glass, a coloring component is added in such a range as not to obstruct achievement of desired chemical strengthening properties. Example coloring components include $CO_3O_4$, $MnO_2$, $Fe_2O_3$, NiO, CuO, $Cr_2O_3$, $V_2O_5$, $Bi_2O_3$, $SeO_2$, $TiO_2$, $CeO_2$, $Er_2O_3$, and $Nd_2O_3$. They may be used alone or may be used in combination.

It is preferable that the total content of coloring components is 7% or less. Occurrence of glass devitrification can thus be prevented. The content of coloring components is even preferably 5% or less, further preferably 3% or less and particularly preferably 1% or less. When it is desired to obtain high visible light transmittance, it is preferable that substantially none of these components is contained.

For ease of manufacture, the liquid-phase temperature of the first glass is preferably 1,670° C. or less, even preferably 1,650° C. or less.

The glass for chemical strengthening of the present invention may be a crystallized glass. When the glass for chemical strengthening is a crystallized glass, a crystallized glass that includes one or more crystals selected from the group consisting of a β-spodumene crystal, a lithium metasilicate crystal, and a lithium phosphate crystal is preferable.

Crystallized glass including the β-spodumene crystal has superior chemical strengthening properties. Since the β-spodumene crystal has a dense crystal structure, it is considered that large compressive stress occurs when ions in the deposited crystals are replaced with larger ions by ion exchange treatment for chemical strengthening, whereby the chemical strengthening is made more effective.

It is known that crystallized glass including the β-spodumene crystal has a small thermal expansion coefficient. Since the present crystallized glass has a small thermal expansion coefficient, the crystallized glass is suppressed in the occurrence of a warp caused by heat treatment that accompanies chemical strengthening etc. Furthermore, since the present crystallized glass is superior in heat shock resistance, the crystallized glass can be heated or cooled quickly and hence is easy to handle as a glass for chemical strengthening. The average thermal expansion coefficient of the present crystallized glass at 50° C.-350° C. is preferably $30\times10^{-7}$/° C. or less, even preferably $25\times10^{-7}$/° C. or less, further preferably $20\times10^{-7}$/° C. or less, and particularly preferably $15\times10^{-7}$/° C. or less. Although the smaller average thermal expansion coefficient at 50° C.-350° C. is more preferable, it is usually $10\times10^{-7}$/° C. or more.

To obtain high mechanical strength, the crystallization rate of the crystallized glass containing the β-spodumene crystal is preferably 10% or more, even preferably 15% or more, further preferably 20% or more, and particularly preferably 25% or more. To obtain high transparency, the crystallization rate is preferably 70% or less, even preferably 60% or less and particularly preferably 50% or less. The crystallized glass having a small crystallization rate is superior in that bending forming with heating or the like can be conducted easily.

A crystallization rate can be calculated from X-ray diffraction intensity by the Rietvelt method. The Rietvelt method is described in "Crystal Analysis Handbook," edited by the Crystal Analysis Handbook edition committee of The Crystallographic Society of Japan (Kyoritsu Shuppan Co., Ltd, 1999, pp. 492-499).

To obtain high transparency, the average grain diameter of deposited crystals of the crystallized glass containing the β-spodumene crystal is preferably 300 nm or less, even preferably 200 nm or less, further preferably 150 nm or less, and particularly preferably 100 nm or less. An average grain diameter of the deposited crystals can be determined from a transmission electron microscope (TEM) image and can be estimated from a scanning electron microscope (SEM) image.

When the glass for chemical strengthening is a crystallized glass, it is preferable to use a glass that is obtained by performing heat treatment on second glass composition described later. The second glass is a glass that is crystallized by proper heat treatment.

It is preferable that the heat treatment employed in this case is two-step heat treatment in which the temperature is increased from room temperature to a first treatment temperature and the first treatment temperature is maintained for a prescribed time and then a second treatment temperature that is higher than the first treatment temperature is maintained for a prescribed time.

In the two-step heat treatment, it is preferable that the first treatment temperature is in a temperature range at which the crystal nucleation rate is high in the glass composition. It is preferable that the second treatment temperature is in a temperature range at which the crystal growth rate is high in the glass composition. Furthermore, it is preferable that the first treatment temperature is kept long so that a sufficient number of crystal nuclei are generated. The generation of a large number of crystal nuclei causes size reduction of each crystal and thereby enables formation of the crystallized glass that is high in transparency.

For example, the first treatment temperature is 550° C.-800° C. and the second treatment temperature is 850° C.-1,000° C. The first treatment temperature is kept for 2 to 10 hours and then the second treatment temperature is kept for 2 to 10 hours.

In the case where the second glass is a crystallized glass including a β-spodumene crystal, it is preferable that it includes, in terms of mass % on an oxide basis:

58-70 mass % of $SiO_2$;
15-30 mass % of $Al_2O_3$;
2-10 mass % of $Li_2O$;
0-5 mass % of $Na_2O$; and
0-2 mass % of $K_2O$,
and has a total content of $Na_2O$ and $K_2O$ of 1-5 mass %.

In the case where the second glass is a crystallized glass including lithium a metasilicate crystal, it is preferable that it includes, in terms of mass % on an oxide basis:
45-70 mass % of $SiO_2$;
1-15 mass % of $Al_2O_3$; and
10-25 mass % of $Li_2O$.

It is preferable that the second glass includes, in terms of mass % on an oxide basis:
0-1.8 mass % of SrO;
0-2 mass % of BaO;
0.5-6 mass % of $SnO_2$;
0.5-6 mass % of $ZrO_2$; and
0-6 mass % of $P_2O_5$.

The composition of the second glass will be described below.

In the second glass, $SiO_2$ is a component for forming a network structure of the glass. Furthermore, $SiO_2$ is a component for increasing the chemical durability as well as a constituent component of the β-spodumene crystal. The content of $SiO_2$ is preferably 45% or more, even preferably 50% or more and further preferably 54% or more. In the crystallized glass containing β-spodumene, it is preferable that the $SiO_2$ content is 58% or more. The $SiO_2$ content is even preferably 60 mass % or more, and further preferably 64 mass % or more. On the other hand, to improve the meltability, the $SiO_2$ content is preferably 70 mass % or less, even preferably 68 mass % or less and further preferably 66 mass % or less.

$Al_2O_3$ is a component that is effective for increasing the surface compressive stress by chemical strengthening, and it is preferable that its content is 1% or more. The content of $Al_2O_3$ is even preferably 2% or more, further preferably 4% or more, particularly preferably 6% or more, and extremely preferably 8% or more. $Al_2O_3$ is a constituent component of the β-spodumene crystal. To have β-spodumene deposited, the content of $Al_2O_3$ is preferably 15 mass % or more, even preferably 20 mass % or more. On the other hand, to prevent the devitrification temperature of the glass from becoming too high, the content of $Al_2O_3$ is preferably 30 mass % or less, and even preferably 25 mass % or less. In crystallized glass not containing β-spodumene, the $Al_2O_3$ content is preferably 15 mass % or less, even preferably 12 mass % or less and further preferably 10 mass % or less.

$Li_2O$ is a component for forming surface compressive stress by ion exchange and is a constituent component of the β-spodumene crystal, lithium metasilicate crystal, and lithium phosphate crystal.

The content of $Li_2O$ is preferably 2 mass % or more, even preferably 4 mass % or more. In crystallized glass containing lithium metasilicate or lithium phosphate, the $Li_2O$ content is preferably 10 mass % or more, even preferably 14 mass % or more, 16 mass % or more, and 18 mass % or more. On the other hand, to increase the stability of the glass, the $Li_2O$ content is preferably 25 mass % or less, even preferably 20 mass % or less. In the crystallized glass containing β-spodumene, the $Li_2O$ content is preferably 10 mass % or less, even preferably 8 mass % or less and further preferably 6 mass % or less.

$Na_2O$ is a component for improving the meltability of the glass. Although $Na_2O$ is not essential, the content thereof is preferably 0.5 mass % or more, even preferably 1 mass % or more. To improve the chemical strengthening properties, the content of $Na_2O$ is preferably 10 mass % or less, and even preferably 8 mass % or less. To have the β-spodumene crystal deposited, the content of $Na_2O$ is preferably 5 mass % or less, even preferably 4 mass % or less and further preferably 3 mass % or less.

$K_2O$ is a component for lowering the glass melting temperature as with $Na_2O$ and may be contained. In the case of containing $K_2O$, the content thereof is preferably 0.5 mass % or more, and even preferably 1 mass % or more. The total content ($Na_2O+K_2O$) of $Na_2O$ and $K_2O$ is preferably 1 mass % or more, and even preferably 2 mass % or more.

Since too much $K_2O$ lowers the chemical strengthening properties, it is preferable that the $K_2O$ content is 5 mass % or less. In particular, to have the β-spodumene crystal deposited, it is preferable that the $K_2O$ content is 2 mass % or less. To make the transparency high, the total content ($Na_2O+K_2O$) of $Na_2O$ and $K_2O$ is preferably 5 mass % or less, even preferably 4 mass % or less and further preferably 3 mass % or less.

It is preferable to have $ZrO_2$ contained because it is a component to constitute crystal nuclei in crystallization treatment. The content of $ZrO_2$ is preferably 0.5 mass % or more, and even preferably 1 mass % or more. In the crystallized glass containing the lithium metasilicate crystal, the $ZrO_2$ content is preferably 2 mass % or more, even preferably 4 mass % or more, 6 mass % or more, and 7 mass % or more. On the other hand, to prevent devitrification at the time of melting, the $ZrO_2$ content is preferably 15 mass % or less, even preferably 12 mass % or less and 10 mass % or less. In the case where the glass composition includes $SnO_2$, to prevent devitrification, the $ZrO_2$ content is preferably 6 mass % or less, even preferably 5 mass % or less and further preferably 4 mass % or less.

Since $SnO_2$ is a component to constitute crystal nuclei in crystallization treatment and, in particular, is highly effective for accelerating the deposition of the β-spodumene crystal, it is preferable that $SnO_2$ is contained at 0.5 mass % or more in the crystallized glass containing β-spodumene. In the case of containing $SnO_2$, the content thereof is preferably 1 mass % or more, and even preferably 1.5 mass % or more. The $SnO_2$ content being 6 mass % or less is preferable because in that case defects due to unmelted materials are less apt to occur in the glass. The $SnO_2$ content of 5 mass % or less is even preferable and the $SnO_2$ content of 4 mass % or less is further preferable.

The total content ($SnO_2+ZrO_2$) of $SnO_2$ and $ZrO_2$ being 3 mass % or more is preferable because in that case $ZrO_2$ nuclei are formed in a large number and the transmittance is thereby increased. The total content ($SnO_2+ZrO_2$) is preferably 4 mass % or more, even preferably 5 mass % or more, particularly preferably 6 mass % or more, and most preferably 7 mass % or more. Furthermore, the total content ($SnO_2+ZrO_2$) is preferably 12 mass % or less because in that case defects due to unmelted materials are less apt to occur in the glass. The total content ($SnO_2+ZrO_2$) is even preferably 10 mass % or less, further preferably 9 mass % or less and particularly preferably 8 mass % or less.

In the case where $SnO_2$ and $ZrO_2$ are both contained, to obtain high transparency, the mass ratio $SnO_2/(SnO_2+ZrO_2)$ of the $SnO_2$ content to the total content is preferably 0.3 or more, even preferably 0.35 or more and further preferably 0.45 or more.

To obtain high strength, the mass ratio $SnO_2/(SnO_2+ZrO_2)$ is preferably 0.7 or less, even preferably 0.65 or less and further preferably 0.6 or less.

$TiO_2$ may be contained because it is a component for forming nuclei of crystallized glass and for making fragments less prone to scatter when the chemically strengthened glass fractures. In the case of containing $TiO_2$, the content thereof is preferably 0.1 mass % or more, even preferably 0.15 mass % or more and further preferably 0.2 mass % or more. In the case where $SnO_2$ is not contained, the $TiO_2$ content is even preferably 0.5 mass % or more, further preferably 1 mass % or more, 2 mass % or more, and 3 mass % or more.

On the other hand, devitrification at the time of melting is prevented and the quality of the chemically strengthened glass can be increased if the $TiO_2$ content is 10 mass % or less. The $TiO_2$ content is preferably 8 mass % or less, 5 mass % or less, 3 mass % or less, and 1.5 mass % or less.

In the case where $Fe_2O_3$ is contained in a glass, when the glass also contains $TiO_2$, a complex called an ilmenite complex is formed and the glass tends to be colored yellow or brown. Since $Fe_2O_3$ is ordinarily contained in a glass as an impurity, to prevent coloration the content of $TiO_2$ is preferably 1 mass % or less, even preferably 0.5 mass % or less and further preferably 0.25 mass % or less. It is particularly preferable that substantially no $TiO_2$ is contained.

Although $P_2O_5$ is not essential, it has an effect of accelerating crystallization by promoting phase separation of a glass and may be contained. In the case of containing $P_2O_5$, the content thereof is preferably 0.1 mass % or more, even preferably 0.5 mass % or more, further preferably 1 mass % or more, particularly preferably 2 mass % or more, 4 mass % or more, and 6 mass % or more. On the other hand, if the $P_2O_5$ content is too high, fragments are prone to scatter when the chemically strengthened glass fractures and acid resistance lowers remarkably. The $P_2O_5$ content is preferably 12 mass % or less, 10 mass % or less and 8 mass % or less. In crystallized glass containing β-spodumene, the $P_2O_5$ content is preferably 6 mass % or less, even preferably 5 mass % or less, further preferably 4 mass % or less, particularly preferably 3 mass % or less, and extremely preferably 2 mass % or less. To further increase the acid resistance, it is preferable that substantially no $P_2O_5$ is contained.

$B_2O_3$ is a component for improving the meltability and may be contained. In the case of containing $B_2O_3$, to improve the meltability, the content thereof is preferably 0.5 mass % or more, even preferably 1 mass % or more and further preferably 2 mass % or more. On the other hand, if the $B_2O_3$ content is 5 mass % or less, occurrence of striae at the time of melting is suppressed and the quality of the glass for chemical strengthening is thereby improved. Therefore the $B_2O_3$ content is preferably 5 mass % or less. The $B_2O_3$ content is even preferably 4 mass % or less, further preferably 3 mass % or less and particularly preferably 1 mass % or less. To obtain high acid resistance, it is preferable that substantially no $B_2O_3$ is contained.

MgO is a component for increasing the surface compressive stress of the chemically strengthened glass and for suppressing the scattering of fragments when the chemically strengthened glass fractures, and may be contained. In the case of containing MgO, the content thereof is preferably 0.5 mass % or more, even preferably 1 mass % or more. On the other hand, to prevent devitrification at the time of melting, the MgO content is preferably 5 mass % or less, even preferably 4 mass % or less and further preferably 3 mass % or less.

CaO is a component for improving the meltability of the glass for chemical strengthening, and may be contained to improve the meltability while preventing devitrification at the time of melting and suppressing increase of the thermal expansion coefficient. In the case of containing CaO, the content thereof is preferably 0.5 mass % or more, even preferably 1 mass % or more. On the other hand, to obtain a better ion exchange characteristic, the CaO content is preferably 4 mass % or less, even preferably 3 mass % or less and particularly preferably 2 mass % or less.

SrO is a component for improving the meltability of the glass for chemical strengthening and for improving the refractive index of the glass. It is preferable to have SrO contained because it improves the transmittance of the crystallized glass and lowers its haze value by making the refractive index of glass phases remaining after crystallization and the refractive index of a deposited crystal closer to each other. In the case of containing SrO, the content thereof is preferably 0.1 mass % or more, even preferably 0.2 mass % or more, further preferably 0.5 mass % or more, and particularly preferably 1 mass % or more.

On the other hand, since too high a SrO content lowers the ion exchange rate, the SrO content is preferably 2.5 mass % or less, even preferably 1.8 mass % or less, further preferably 1.5 mass % or less, particularly preferably 1 mass % or less, and most preferably 0.5 mass % or less.

BaO is a component for improving the meltability of the glass for chemical strengthening, and for improving the refractive index of the glass. BaO may be contained because it improves the transmittance of the crystallized glass and lowers its haze value by making the refractive index of glass phases remaining after crystallization and the refractive index of β-spodumene crystal phases closer to each other. In the case of containing BaO, the content thereof is preferably 0.1 mass % or more, even preferably 0.2 mass % or more, further preferably 0.5 mass % or more, and particularly preferably 1 mass % or more. On the other hand, too high a BaO content lowers the ion exchange rate, the BaO content is preferably 2 mass % or less, even preferably 1.5 mass % or less, further preferably 1 mass % or less, particularly preferably 0.5 mass % or less, and most preferably 0.3 mass % or less.

In the crystallized glass containing β-spodumene, to increase the transmittance of the chemically strengthened glass and lower its haze value, it is preferable that one or both of SrO and BaO is contained. The total content of SrO and BaO is preferably 0.1 mass % or more, even preferably 0.2 mass % or more, even preferably 0.5 mass % or more, further preferably 1 mass % or more, and particularly preferably 1.5 mass % or more. On the other hand, too high a total content of SrO and BaO causes a large difference between the refractive index of glass phases remaining after crystallization and the refractive index of β-spodumene crystal phases, thereby decreasing transmittance. The total content of SrO and BaO is preferably 3 mass % or less, even preferably 2 mass % or less, further preferably 1.5 mass % or less, even further preferably 1 mass % or less, particularly preferably 0.8 mass % or less, and most preferably 0.5 mass % or less.

ZnO, which is a component for lowering the thermal expansion coefficient of the glass for chemical strengthening and for increasing the chemical durability, may be contained to improve the transmittance of the crystallized glass and decrease its haze value. In the case of containing ZnO, the content thereof is preferably 0.5 mass % or more, even preferably 1 mass % or more, further preferably 1.5 mass % or more, and particularly preferably 2 mass % or more to make the refractive index of glass phases remaining after crystallization and the refractive index of β-spodumene crystal phases closer to each other. On the other hand, to prevent devitrification at the time of melting, the ZnO content is preferably 4 mass % or less, even preferably 3 mass % or less, and further preferably 2 mass % or less.

Each of $Y_2O_3$, $La_2O_3$, $Nb_2O_5$, and $Ta_2O_5$ is a component for making fragments less prone to scatter when the chemically strengthened glass fractures and may be contained to increase the refractive index. In the case of containing these components, the total content ($Y_2O_3+La_2O_3+Nb_2O_5$) of $Y_2O_3$, $La_2O_3$, and $Nb_2O_5$ is preferably 0.5 mass % or more, even preferably 1 mass % or more, further preferably 1.5 mass % or more, and particularly preferably 2 mass % or more. Furthermore, to make the glass less prone to suffer devitrification at the time of melting, the total content ($Y_2O_3+La_2O_3+Nb_2O_5$) is preferably 4 mass % or less, even preferably 3 mass % or less, further preferably 2 mass % or less, and particularly preferably 1 mass % or less.

The total content ($Y_2O_3+La_2O_3+Nb_2O_5+Ta_2O_5$) of $Y_2O_3$, $La_2O_3$, $Nb_2O_5$, and $Ta_2O_5$ is preferably 0.5 mass % or more, even preferably 1 mass % or more, further preferably 1.5 mass % or more, and particularly preferably 2 mass % or more. Furthermore, to make the glass less prone to suffer devitrification at the time of melting, the total content ($Y_2O_3+La_2O_3+Nb_2O_5+Ta_2O_5$) is preferably 4 mass % or less, even preferably 3 mass % or less, further preferably 2 mass % or less, and particularly preferably 1 mass % or less.

The second glass may contain $CeO_2$. Since $CeO_2$ has an effect of oxidizing glass, in the case where the $SnO_2$ content is high, $CeO_2$ may suppress the coloration by suppressing reduction of $SnO_2$ to $SnO$ which is a coloration component. In the case of containing $CeO_2$, the content thereof is preferably 0.03 mass % or more, even preferably 0.05 mass % or more and further preferably 0.07 mass % or more. When $CeO_2$ is used as an oxidizer, to increase the transparency, the content thereof is preferably 1.5 mass % or less, and even preferably 1 mass % or less.

When the second glass is to be colored, coloring components may be added in such a range as not to obstruct the achievement of desired chemical strengthening properties.

Preferable example coloring components include $CO_3O_4$, $MnO_2$, $Fe_2O_3$, $NiO$, $CuO$, $Cr_2O_3$, $V_2O_5$, $Bi_2O_3$, $SeO_2$, $Er_2O_3$, and $Nd_2O_3$. It is preferable that the total content of the coloring components is 1 mass % or less. When it is desired to set the visible light transmittance of the glass to be higher, it is preferable that substantially none of these components is contained.

As a refining agent to be used at the time of melting of the glass, $SO_3$, a chloride, a fluoride or the like may be contained as appropriate. It is preferable that $As_2O_3$ is not contained. In the case of containing $Sb_2O_3$, its content is preferably 0.3 mass % or less, even preferably 0.1 mass % or less. It is most preferable that no $Sb_2O_3$ is contained.

<Cover Glass and Electronic Device>

The present chemically strengthened glass sheet is particularly useful when used as the cover glass for a mobile electronic device such as a cellphone, a smartphone, a portable information terminal (PDA) or a tablet terminal. The present chemically strengthened glass sheet is also useful when used as the cover glass for an electronic device that is not intended for carrying, such as a television (TV), a personal computer (PC), or a touch panel. Furthermore, the present chemically strengthened glass sheet is useful when used as, for example, a construction material such as a window glass, a table top, an interior material of a motor vehicle, an airplane, or the like or a cover glass thereof.

The present chemically strengthened glass sheet can be formed into a shape other than a flat sheet shape by subjecting it to bending or forming before or after chemical strengthening, it is useful when used as, for example, a body having curved surfaces.

Figure 4:
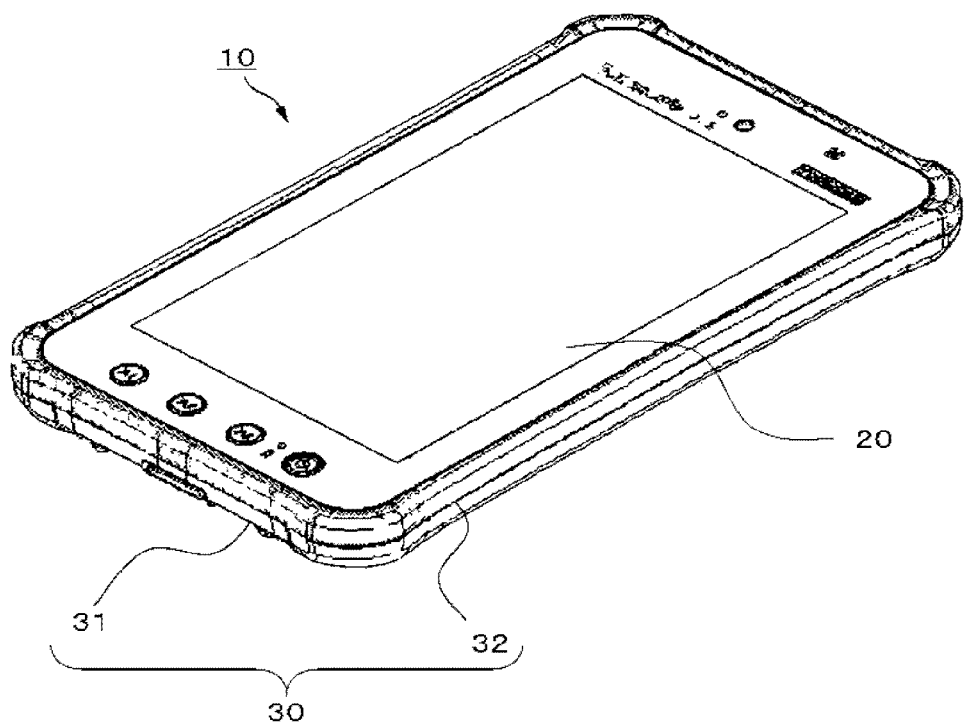
FIG. 4 is a view showing an example of an electronic device including a chemically strengthened glass sheet of the present invention.

FIG. 4 shows an example of an electronic device including the present chemically strengthened glass sheet. A portable terminal 10 shown in FIG. 4 includes a cover glass 20 and a body 30. The body 30 has side surfaces 32 and a bottom surface 31. The present chemically strengthened glass can be used for both of the cover glass 20 and the body 30.

EXAMPLES

Although the present invention will be described below using Examples, the invention is not limited to them. Examples 1-4 are Comparative Examples and Examples 5-12 are Working Examples.

Glass raw materials were mixed so as to prepare compositions of glass A to glass G that are shown in Table 1 in terms of mol % on an oxide basis, and then weighed so as to prepare a glass having a weight of 900 g. The mixed raw materials were put into a platinum crucible and then set in an electric furnace having a temperature of 1,500-1,700° C., where they were melted for about three hours. Then the raw materials were subjected to defoaming and homogenization.

Molten glass thus obtained was poured into a mold, held for one hour at a temperature that was equal to a glass transition temperature plus 50° C., and cooled to room temperature at a rate of 0.5° C./min, whereby a glass block was obtained. The glass block obtained was cut and ground. Finally, both surfaces thereof were mirror-polished to obtain a glass sheet.

TABLE 1

| mol % | Glass A | Glass B | Glass C | Glass D | Glass E | Glass F | Glass G |
|---|---|---|---|---|---|---|---|
| $SiO_2$ | 70.0 | 66.2 | 70.4 | 53.6 | 50.8 | 50.8 | 53.6 |
| $Al_2O_3$ | 7.5 | 11.2 | 13.0 | 32.1 | 30.5 | 30.5 | 32.1 |
| $Li_2O$ | 8.0 | 10.4 | 8.4 | 10.7 | 10.2 | 10.2 | 9.6 |
| $Na_2O$ | 5.3 | 5.6 | 2.4 | 0.0 | 0.0 | 0.0 | 1.1 |
| $K_2O$ | 1.0 | 1.5 | 0.0 | 0.0 | 0.0 | 0.0 | 0.0 |
| $B_2O_3$ | 0.0 | 0.0 | 1.8 | 0.0 | 0.0 | 5.1 | 0.0 |
| $P_2O_5$ | 0.0 | 0.0 | 0.0 | 0.0 | 5.1 | 0.0 | 0.0 |
| MgO | 7.0 | 3.1 | 2.8 | 0.0 | 0.0 | 0.0 | 0.0 |
| CaO | 0.2 | 0.2 | 0.0 | 0.0 | 0.0 | 0.0 | 0.0 |
| ZnO | 0.0 | 0.0 | 0.9 | 0.0 | 0.0 | 0.0 | 0.0 |
| $Y_2O_3$ | 0.0 | 0.5 | 0.0 | 3.6 | 3.4 | 3.4 | 3.6 |
| $ZrO_2$ | 1.0 | 1.3 | 0.0 | 0.0 | 0.0 | 0.0 | 0.0 |

Each of glass sheets having compositions shown in the "glass composition" section of Tables 2 and 3 was chemically strengthened by subjecting it to ion exchange treatment under conditions shown in the "treatment condition 1" section using a salt shown in the "molten salt 1" section and then to ion exchange treatment under conditions shown in the "treatment condition 2" section using a salt shown in the "molten salt 2" section.

Resulting chemically strengthened glass was worked into a shape of 0.3 mm×20 mm×sheet thickness, and a stress profile thereof was measured using a birefringence stress meter (a birefringence imaging system Abrio-IM produced by CRi, Inc.).

Figure 2:
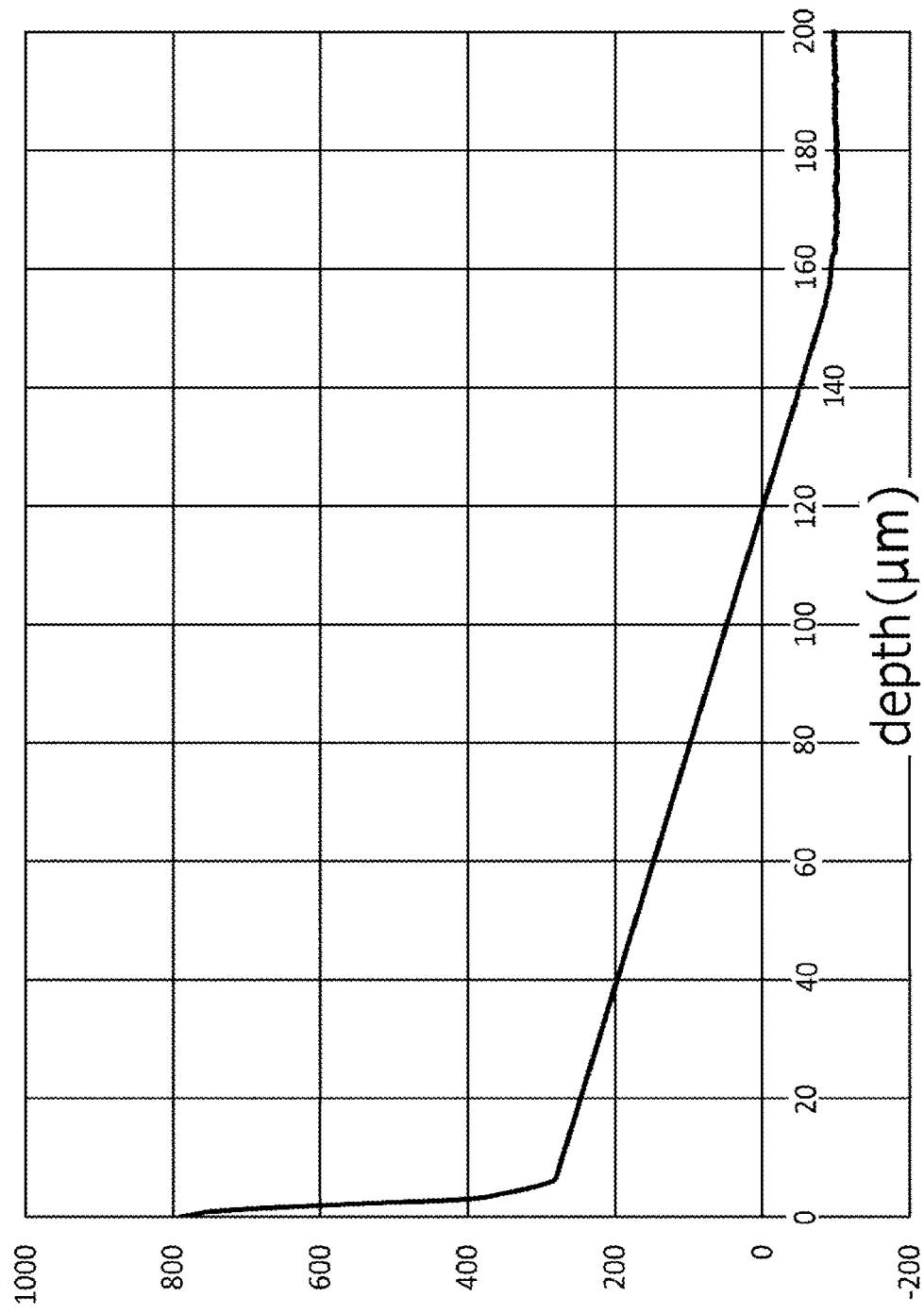
FIG. 2 is a graph showing an example stress profile of a chemically strengthened glass sheet.

FIG. 1 shows stress profiles of Example 1 (broken line) and Example 5 (solid line), and FIG. 2 shows a stress profile of Example 11. Furthermore, SA, SB, SB/(SA×t), DOL, surface compressive stress ($CS_0$), a stress value $CS_{10}$ at a depth of 10 m, and a stress value $CS_{50}$ at a depth of 50 μm were determined. Results are shown in Tables 2 and 3.

Each chemically strengthened glass was worked into a strip shape of 10 mm×50 mm and was subjected to four-point bending strength measurement by performing a four-point bending test under conditions that the distance between outside support points and the distance between inside support points of a support were 30 mm and 10 mm, respectively, and the crosshead speed was 0.5 mm/min. The number of test pieces were 10. Results are shown in Tables 2 and 3.

Example 12

Glass raw materials were mixed so as to prepare the following glass composition (glass composition H) and weighed so as to prepare a glass having a weight of 800 g.

$SiO_2$: 62.9 mass %; $Al_2O_3$: 22.4 mass %; $Li_2O$: 4.3 mass %; $Na_2O$: 2.0 mass %; SrO: 1.0 mass %; $ZrO_2$: 2.3 mass %; $SnO_2$: 2.1 mass %; and $P_2O_5$: 3.0 mass %.

The mixed glass raw materials were put into a platinum crucible and then set in an electric furnace having a temperature of about 1,600° C., where they were melted for about five hours. Then the raw materials were subjected to defoaming and homogenization. Molten glass thus obtained was poured into a mold, held for about one hour at a temperature around a glass transition temperature (714° C.), and cooled to room temperature at a rate of 0.5° C./min, whereby a glass block was obtained. The glass block obtained was worked into a shape of 50 mm×50 mm×1.5 mm, held at 750° C. for one hour and then held at 900° C. for four hours, whereby a crystallized glass was obtained.

By using a part of the crystallized glass obtained, it was confirmed that it included a β-spodumene crystal by powder X-ray diffraction. This crystallized glass had a transmittance of 90.2% and a haze value of 0.23%.

Figure 3:
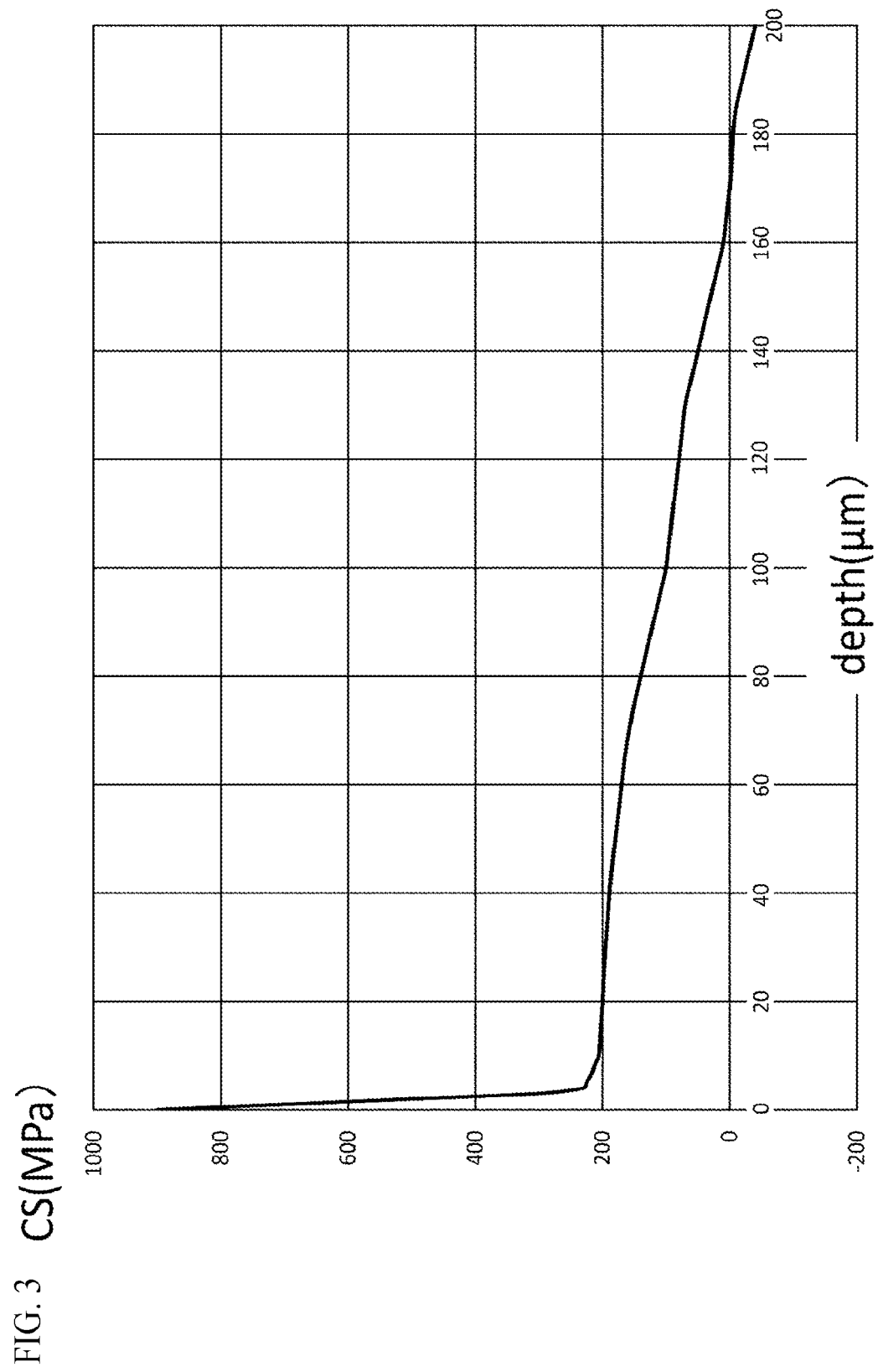
FIG. 3 is a graph showing an example stress profile of a chemically strengthened glass sheet.

Furthermore, a chemically strengthened glass having a stress profile shown in FIG. 3 was obtained by chemically strengthening the crystallized glass sheet. In the chemical strengthening treatment, ion exchange treatment was performed under the conditions shown in the "treatment condition 1" section of Table 3 using the salt shown in the "molten salt 1" section of Table 3, then heat treatment was performed in a state that the glass was not in contact with the molten salt, and ion exchange treatment was performed thereafter under the conditions shown in the "treatment condition 2" section using the salt shown in the "molten salt 2" section.

TABLE 2

|  | Ex. 1 | Ex. 2 | Ex. 3 | Ex. 4 | Ex. 5 | Ex. 6 |
| --- | --- | --- | --- | --- | --- | --- |
| Glass composition | A | A | B | C | D | D |
| Glass sheet thickness (mm) | 0.8 | 0.8 | 0.6 | 0.8 | 0.8 | 0.8 |
| Molten salt 1 | $NaNO_3$ | $NaNO_3$ | $NaNO_3$ | $NaNO_3$ | $NaNO_3$ | $NaNO_3$ |
| Treatment condition 1 | 450° C. 2 hr | 450° C. 4 hr | 450° C. 1 hr | 450° C. 1 hr | 450° C. 24 hr | 450° C. 24 hr |
| Molten salt 2 | $KNO_3$ | $KNO_3$ | $KNO_3$ | $KNO_3$ | $KNO_3$ | $KNO_3$ |
| Treatment condition 2 | 425° C. 1 hr | 415° C. 2.5 hr | 425° C. 0.5 hr | 450° C. 2 hr | 450° C. 12 hr | 450° C. 6 hr |
| SA (MPa · μm) | 3,255 | 3,792 | 3,905 | 4,107 | 2,803 | 3,159 |
| SB (MPa · μm) | 7,419 | 9,671 | 10,497 | 8,540 | 18,575 | 21,600 |
| SB/(SA × t) ($mm^{-1}$) | 2.8 | 3.2 | 4.5 | 2.6 | 8.3 | 8.5 |
| SA + SB (MPa · μm) | 10,674 | 13,463 | 14,402 | 12,647 | 21,378 | 24,759 |
| DOL (μm) | 129 | 158 | 104 | 191 | 111 | 101 |
| Surface compressive stress (MPa) | 860 | 909 | 1,120 | 1,033 | 229 | 260 |
| $CS_{10}$ (MPa) | 150 | 163 | 142 | 169 | 257 | 350 |
| $CS_{50}$ (MPa) | 84 | 98 | 125 | 74 | 238 | 298 |
| CT (MPa) | 45 | 57 | 61 | 53 | 90 | 104 |
| Four-point bending strength (MPa) | 847 | 879 | 1,103 | 1,010 | 729 | 750 |

TABLE 3

|  | Ex. 7 | Ex. 8 | Ex. 9 | Ex. 10 | Ex. 11 | Ex. 12 |
| --- | --- | --- | --- | --- | --- | --- |
| Glass composition | E | E | F | F | G | H |
| Glass sheet thickness (mm) | 0.8 | 0.8 | 0.8 | 0.8 | 0.8 | 0.8 |
| Molten salt 1 | $NaNO_3$ | $NaNO_3$ | $NaNO_3$ | $NaNO_3$ | $NaNO_3$ | $NaNO_3$ |
| Treatment condition 1 | 450° C. 24 hr | 450° C. 24 hr | 450° C. 24 hr | 450° C. 24 hr | 450° C. 24 hr | 450° C. 2 hr |
| Heat treatment |  |  |  |  |  | 450° C. 3 hr |
| Molten salt 2 | $KNO_3$ | $KNO_3$ | $KNO_3$ | $KNO_3$ | $KNO_3$ | $KNO_3$ |
| Treatment condition 2 | 450° C. 12 hr | 450° C. 6 hr | 450° C. 12 hr | 450° C. 6 hr | 450° C. 12 hr | 450° C. 0.05 hr |
| SA (MPa · μm) | 2,719 | 3,101 | 2,598 | 2,910 | 2,910 | 3,920 |
| SB (MPa · μm) | 14,678 | 16,591 | 17,921 | 20,417 | 20,417 | 19,380 |
| SB/(SA × t) ($mm^{-1}$) | 6.7 | 6.7 | 8.6 | 8.8 | 8.8 | 6.2 |
| SA + SB (MPa · μm) | 17,397 | 19,692 | 20,519 | 23,327 | 23,327 | 23,300 |
| DOL (μm) | 130 | 115 | 117 | 106 | 130 | 170 |
| Surface compressive stress (MPa) | 250 | 232 | 251 | 207 | 850 | 897 |
| $CS_{10}$ (MPa) | 212 | 220 | 241 | 262 | 215 | 206 |
| $CS_{50}$ (MPa) | 180 | 201 | 210 | 231 | 172 | 180 |
| CT (MPa) | 73 | 83 | 86 | 98 | 98 | 97 |
| Four-point bending strength (MPa) | 689 | 701 | 658 | 668 | 883 | 832 |

As shown in Tables 2 and 3, in Examples 1-4 which are Comparative Examples, SB/(SA×t) and the compressive stress value at the depth of 50 μm are smaller than in Examples 5-12 which are Working Examples. It was therefore found that the chemically strengthened glass of each of Examples 1-4 is prone to fracture when colliding with a projection.

Although the present invention has been described in detail with reference to the particular embodiment, it is apparent for those skilled in the art that various changes and modifications are possible without departing from the spirit and scope of the present invention. The present application is based on Japanese Patent Application No. 2018-231776 filed on Dec. 11, 2018, the disclosure of which is incorporated herein by reference. Furthermore, all referenced information that are cited herein are incorporated as a whole.

REFERENCE SIGNS LIST

10: Portable terminal
20: Cover glass
30: Body
31: Bottom surface
32: Side surface

The invention claimed is:

1. A chemically strengthened glass sheet, wherein the chemically strengthened glass sheet has a value of SB/(SA×t) of 5.0 mm$^{-1}$ or more, where SA (MPa·μm) is an integrated value of a compressive stress from a surface of the glass sheet to a depth of 10 μm, SB (MPa·μm) is an integrated value of a compressive stress from the depth of 10 μm to DOL which is a depth at which the compressive stress is zero, t (mm) is a thickness of the glass sheet, and SA is 4,000 MPa·μm or less and SB is 12,000 MPa·μm or more.

2. The chemically strengthened glass sheet according to claim 1, wherein the DOL is 110 μm or more.

3. The chemically strengthened glass sheet according to claim 1, wherein the chemically strengthened glass sheet has a four-point bending strength of 600 MPa or more.

4. The chemically strengthened glass sheet according to claim 1, wherein the chemically strengthened glass sheet has a compressive stress value of 150 MPa or more at a position of a depth of 50 μm from the surface.

5. The chemically strengthened glass sheet according to claim 1, wherein the chemically strengthened glass sheet has a surface compressive stress value of 500 MPa or more.

6. The chemically strengthened glass sheet according to claim 1, wherein the chemically strengthened glass sheet has a base composition comprising, in terms of mol % on an oxide basis, 40-60% of $SiO_2$, 20-45% of $Al_2O_3$ and 5-15% of $Li_2O$.

7. The chemically strengthened glass sheet according to claim 1, wherein the chemically strengthened glass sheet is a crystallized glass comprising one or more crystals selected from the group consisting of a β-spodumene crystal, a lithium metasilicate crystal, and a lithium phosphate crystal.

8. The chemically strengthened glass sheet according to claim 7, wherein the crystallized glass comprises the β-spodumene crystal comprising, in terms of mass % on an oxide basis, 58-70 mass % of $SiO_2$, 15-30 mass % of $Al_2O_3$, 2-10 mass % of $Li_2O$, 0-5 mass % of $Na_2O$, and 0-2 mass % of $K_2O$, and having a total content of $Na_2O$ and $K_2O$ of 1-5 mass %.

9. A cover glass, comprising:
the chemically strengthened glass sheet of claim 1.

10. An electronic device, comprising:
the chemically strengthened glass sheet of claim 1.

11. The chemically strengthened glass sheet according to claim 1, wherein a sum (SA+SB) of SA and SB is 15,000 MPa·μm or more.

12. The chemically strengthened glass sheet according to claim 11, wherein the DOL is 110 μm or more.

13. The chemically strengthened glass sheet according to claim 11, wherein the chemically strengthened glass sheet has a four-point bending strength of 600 MPa or more.

14. The chemically strengthened glass sheet according to claim 11, wherein the chemically strengthened glass sheet has a compressive stress value of 150 MPa or more at a position of a depth of 50 μm from the surface.

15. The chemically strengthened glass sheet according to claim 11, wherein the chemically strengthened glass sheet has a surface compressive stress value of 500 MPa or more.

16. The chemically strengthened glass sheet according to claim 1, wherein the chemically strengthened glass sheet has a base composition comprising, in terms of mol % on an oxide basis, 40-60% of $SiO_2$, 20-45% of $Al_2O_3$ and 5-15% of $Li_2O$.

17. The chemically strengthened glass sheet according to claim 11, wherein the chemically strengthened glass sheet is a crystallized glass comprising one or more crystals selected from the group consisting of a β-spodumene crystal, a lithium metasilicate crystal, and a lithium phosphate crystal.

18. The chemically strengthened glass sheet according to claim 17, wherein the crystallized glass comprises the β-spodumene crystal comprising, in terms of mass % on an oxide basis, 58-70 mass % of $SiO_2$, 15-30 mass % of $Al_2O_3$, 2-10 mass % of $Li_2O$, 0-5 mass % of $Na_2O$, and 0-2 mass % of $K_2O$, and having a total content of $Na_2O$ and $K_2O$ of 1-5 mass %.

19. A cover glass, comprising:
the chemically strengthened glass sheet of claim 11.

20. An electronic device, comprising:
the chemically strengthened glass sheet of claim 11.

* * * * *